(12) United States Patent
Shen

(10) Patent No.: US 7,158,092 B2
(45) Date of Patent: Jan. 2, 2007

(54) CELLULAR PHONE HOLDER

(76) Inventor: Vincent Shen, 3F., No. 2, Alley 16, Lane 235, Baociao Rd., Sindian City, Taipei County 231 (TW)

( * ) Notice: Subject to any disclaimer, the term of this patent is extended or adjusted under 35 U.S.C. 154(b) by 142 days.

(21) Appl. No.: 11/045,385

(22) Filed: Jan. 31, 2005

(65) Prior Publication Data

US 2006/0183511 A1  Aug. 17, 2006

(51) Int. Cl.
*H01Q 1/12* (2006.01)
(52) U.S. Cl. .......................................... 343/878; 455/90
(58) Field of Classification Search ................ 343/878, 343/702; 455/90, 575; 379/455
See application file for complete search history.

(56) References Cited

U.S. PATENT DOCUMENTS

| | | | | |
|---|---|---|---|---|
| 5,396,556 A | * | 3/1995 | Chen | ........................... 379/446 |
| 5,903,645 A | * | 5/1999 | Tsay | ........................... 379/455 |
| 6,360,083 B1 | * | 3/2002 | Fan | ........................... 455/90.1 |
| 6,665,524 B1 | * | 12/2003 | Niemann | .................. 248/309.1 |
| 6,816,713 B1 | * | 11/2004 | Chen | ........................... 455/90.3 |
| 2005/0236536 A1 | * | 10/2005 | Fan | ........................... 248/176.3 |

* cited by examiner

*Primary Examiner*—Hoang V. Nguyen

(57) ABSTRACT

An cellular phone holder includes a holder apparatus, a fixed apparatus, and an operating apparatus. The holder apparatus includes a main body. The fixed apparatus includes a fixed plate longitudinally disposed thereon. A teeth-formed end composed of a plurality of protruding teeth is formed on one side of the fixed plate, and the protruding teeth are upwardly inclined. The operating apparatus includes an operating element transversely disposed on the main body, and a plurality of propping teeth corresponding to the teeth-formed end are formed on the operating element, and the propping teeth are downwardly inclined, which has the stable and accurate effective, thereby accurately fastening without the shaking phenomenon.

14 Claims, 6 Drawing Sheets

CELLULAR PHONE HOLDER

BACKGROUND OF THE INVENTION

1. Field of the Invention

The present invention relates to a cellular phone holder, and more specifically to, an improved structure of cellular phone holder, which has the stable and accurate effective, thereby accurately fastening without the shaking phenomenon.

2. Description of the Related Art

Portable communication devices such as cellular phones, satellite phones, and radiophones, are becoming increasingly popular. The cellular phone holder is used to place and hold the cellular phone. Many persons carry a portable communications device in their automobile with them and may wish to use the device while operating the car. The conventional cellular phone holder, as shown in FIG. 1, comprises a main body 90. A fixed plate 91 is pivoted on the central portion of the main body 90. A teeth-formed end 92 is formed on one side of the fixed plate 91. An operating element 93 is pivoted on the main body 90 corresponding to one side of the teeth-formed end 92. The operating element 93 is used to rotate and turn, and comprises an arced pushing-teeth 94 formed thereon. A pushing plate 95 is pivoted on the main body 90 corresponding to the pushing-teeth 94. A row-teeth 96 is formed on the pushing plate 95 to engage with the pushing-tooth 94. A protruding teeth 97 is formed on the pushing plate 95 corresponding to the teeth-formed end 92. The operating element 93 is upwardly pushed associating with moving backwardly the pushing plate 95 while using the cellular phone holder, resulting in loosing the protruding teeth 97 from the teeth-formed end 92. At the meantime, after the fixed plate 91 is pulled and the cellular phone is placed in the holder, the fixed plate 91 is downwardly pushed until the fastener 911 on the top of the fixed plate 91 goes against the cellular phone 100, thereby fastening the cellular phone 100 on the main body 90. In the conventional cellular phone holder, the pushing plate 95 further comprises a resilience device with permanent downwardly rotation disposed thereon, thereby returning the operating element 93 automatically.

Although the above mentioned cellular phone holder can fasten the cellular phone 100, the protruding teeth 97 and the teeth-formed end 92 are easily slipped away because only one protruding teeth 97 is formed on the pushing plate 95 and the protruding teeth 97 and the teeth-formed end 92 are disposed with the same angle. Since the pitch of single protruding teeth 97 has larger pitch, the gap of the fixed plate 91 is displaced after the fastener 911 on the top of the fixed plate 91 goes against the cellular phone 100, thereby unfixing the fixed plate and the cellular phone, resulting in causing the shaking phenomenon. It generates the noise during the operation because the corresponding movement of the protruding teeth 97 and the teeth-formed end 92 has a larger angle.

In view of this, the present invention provides an improved structure of cellular phone holder to overcome the above-mentioned disadvantages.

SUMMARY OF THE INVENTION

The present invention provides an improved structure of cellular phone holder, which has the stable and accurate effective, thereby accurately fastening without the shaking phenomenon.

The present invention also provides an improved structure of cellular phone holder, which reduces the noise during the operation, thereby having the better mute operation.

According to a preferred embodiment of the present invention, an improved structure of cellular phone holder is provided, comprising a holder apparatus, a fixed apparatus, and an operating apparatus. The holder apparatus comprises a main body. The fixed apparatus comprises a fixed plate longitudinally disposed thereon. A teeth-formed end composed of a plurality of protruding teeth is formed on one side of the fixed plate, and the protruding teeth are upwardly inclined. The operating apparatus comprises an operating element transversely disposed on the main body, and a plurality of propping teeth corresponding to the teeth-formed end are formed on the operating element, and the propping teeth are downwardly inclined, which has the better fixed position.

The objectives of the present invention will become obvious to those of ordinary skill in the art after reading the following detailed description of the preferred embodiment.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION OF THE PREFERRED EMBODIMENTS

Figure 1:
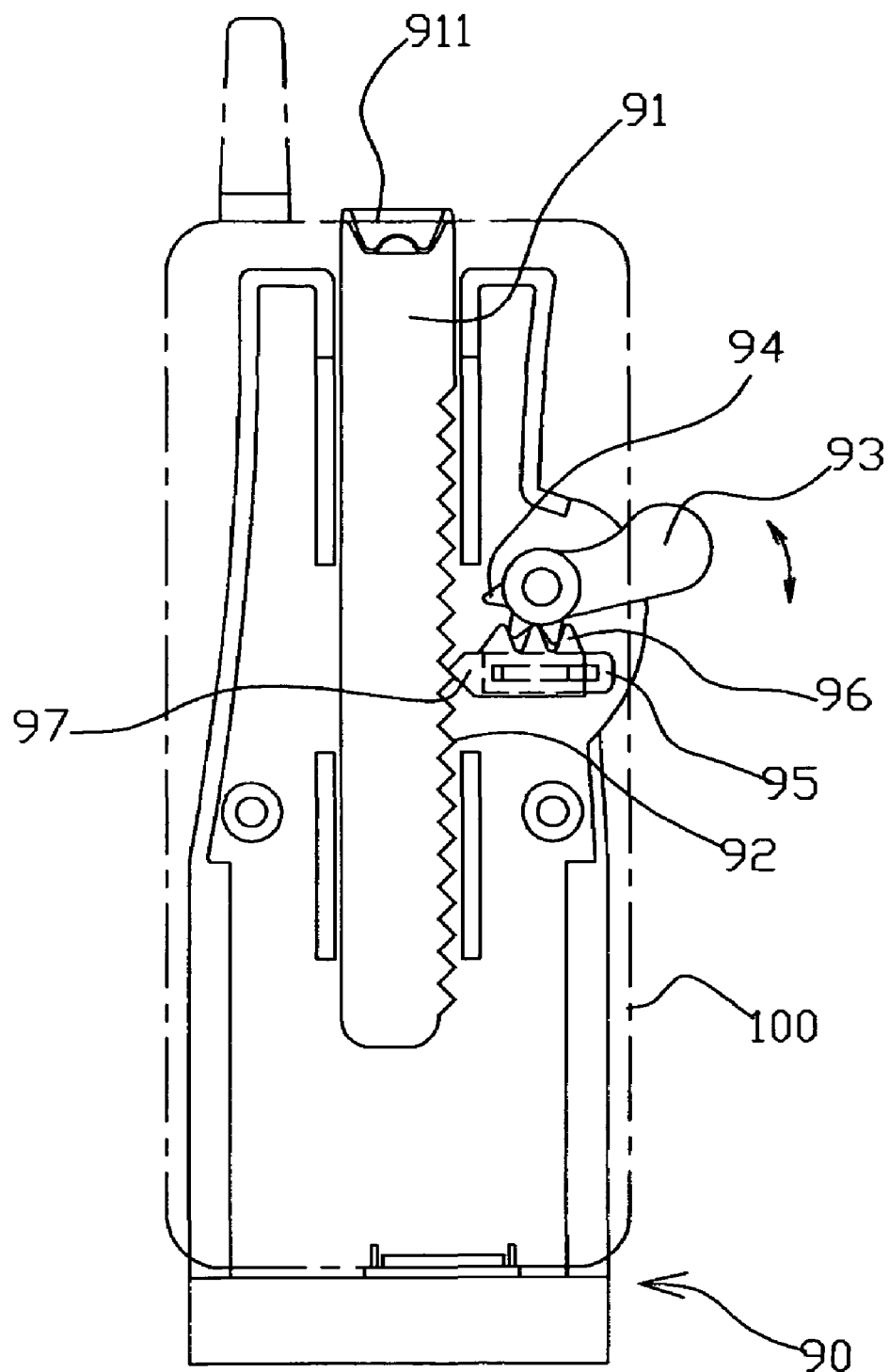
FIG. 1 shows the structure of a typical holder for cellular phones.
Figure 2:
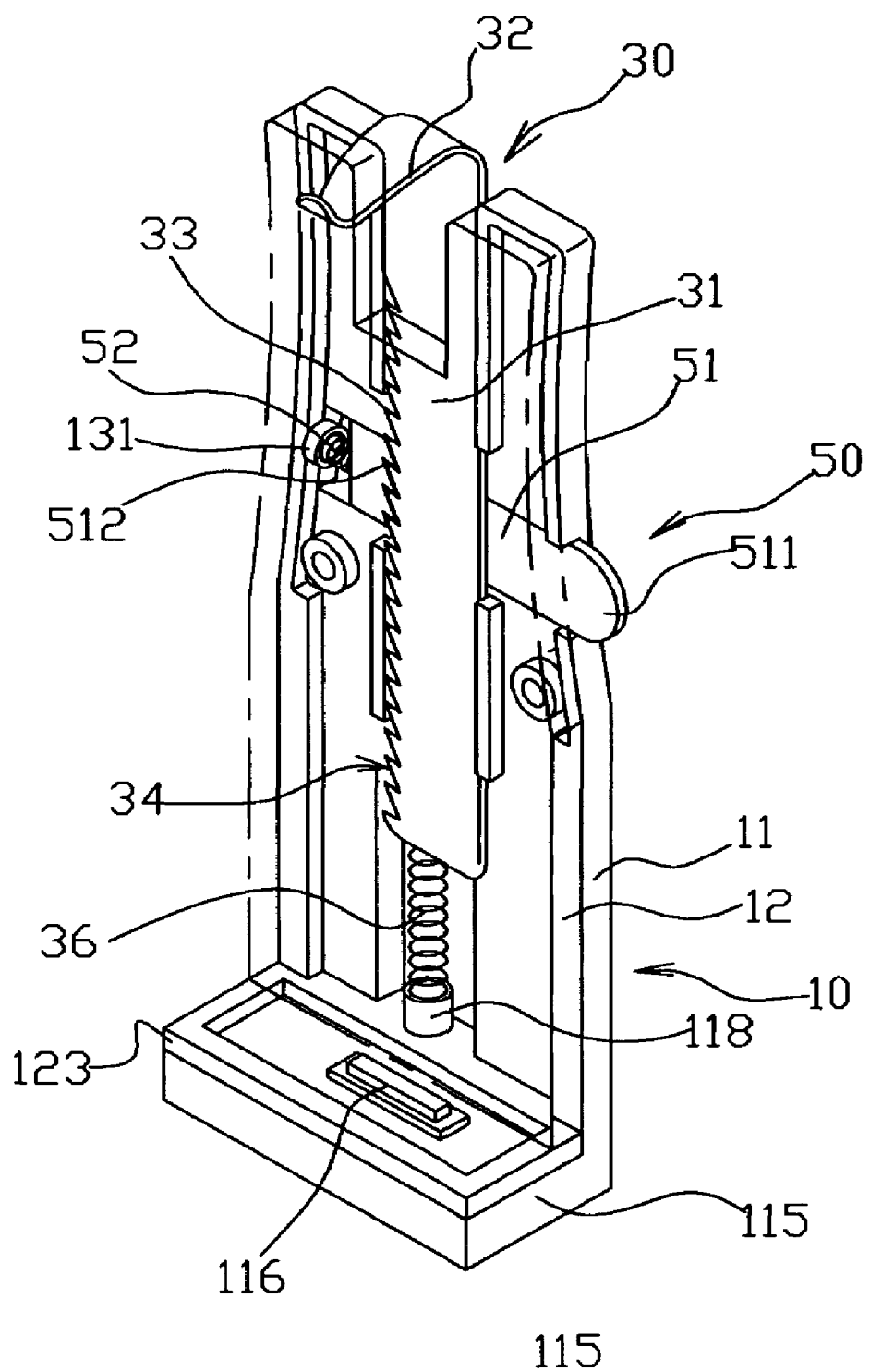
FIG. 2 is a perspective view showing the structure of the cellular phone holder in accordance with a preferred embodiment of the present invention.
Figure 3:
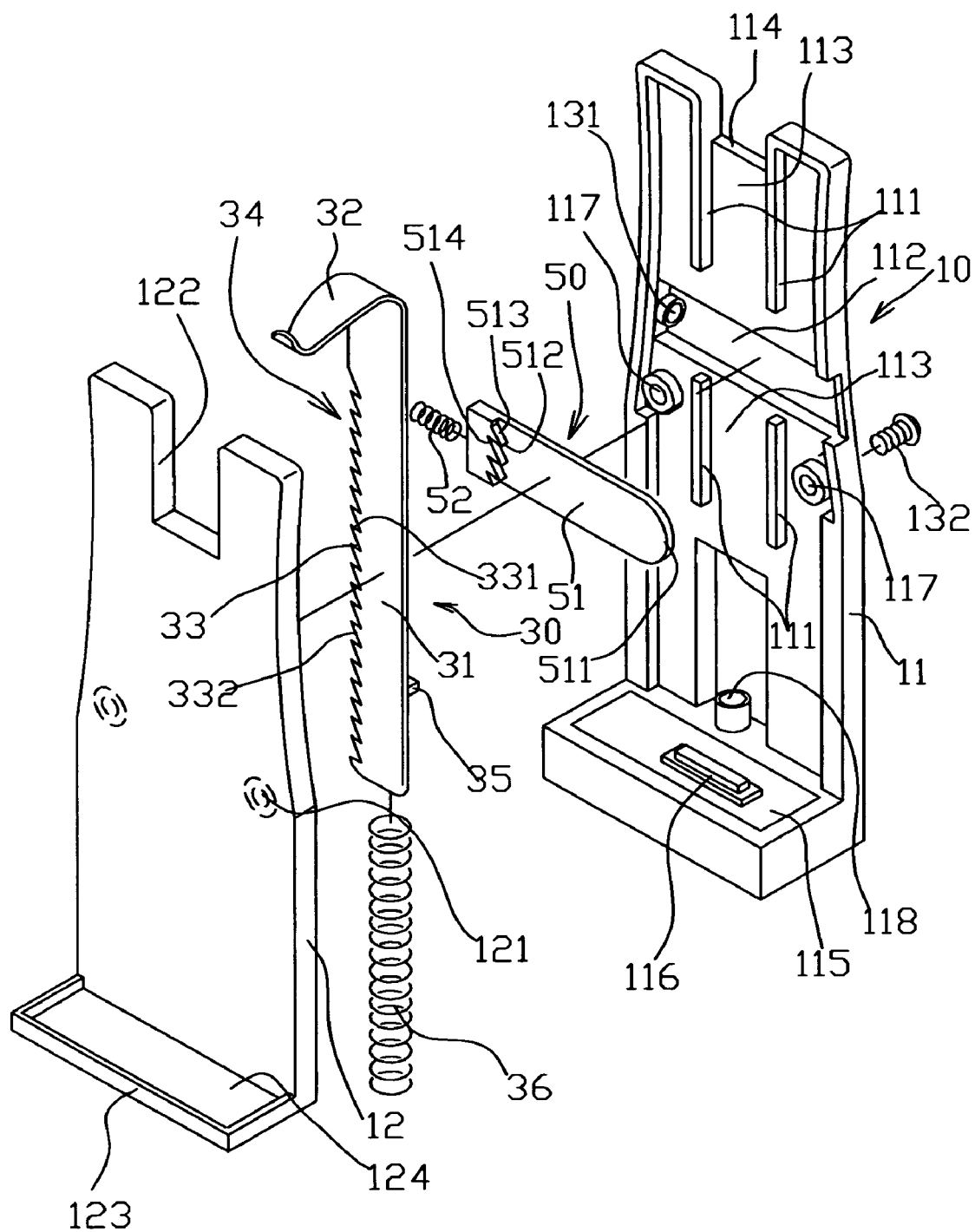
FIG. 3 is an exploded perspective view showing the structure of the cellular phone holder in accordance with a preferred embodiment of the present invention.
Figure 4:
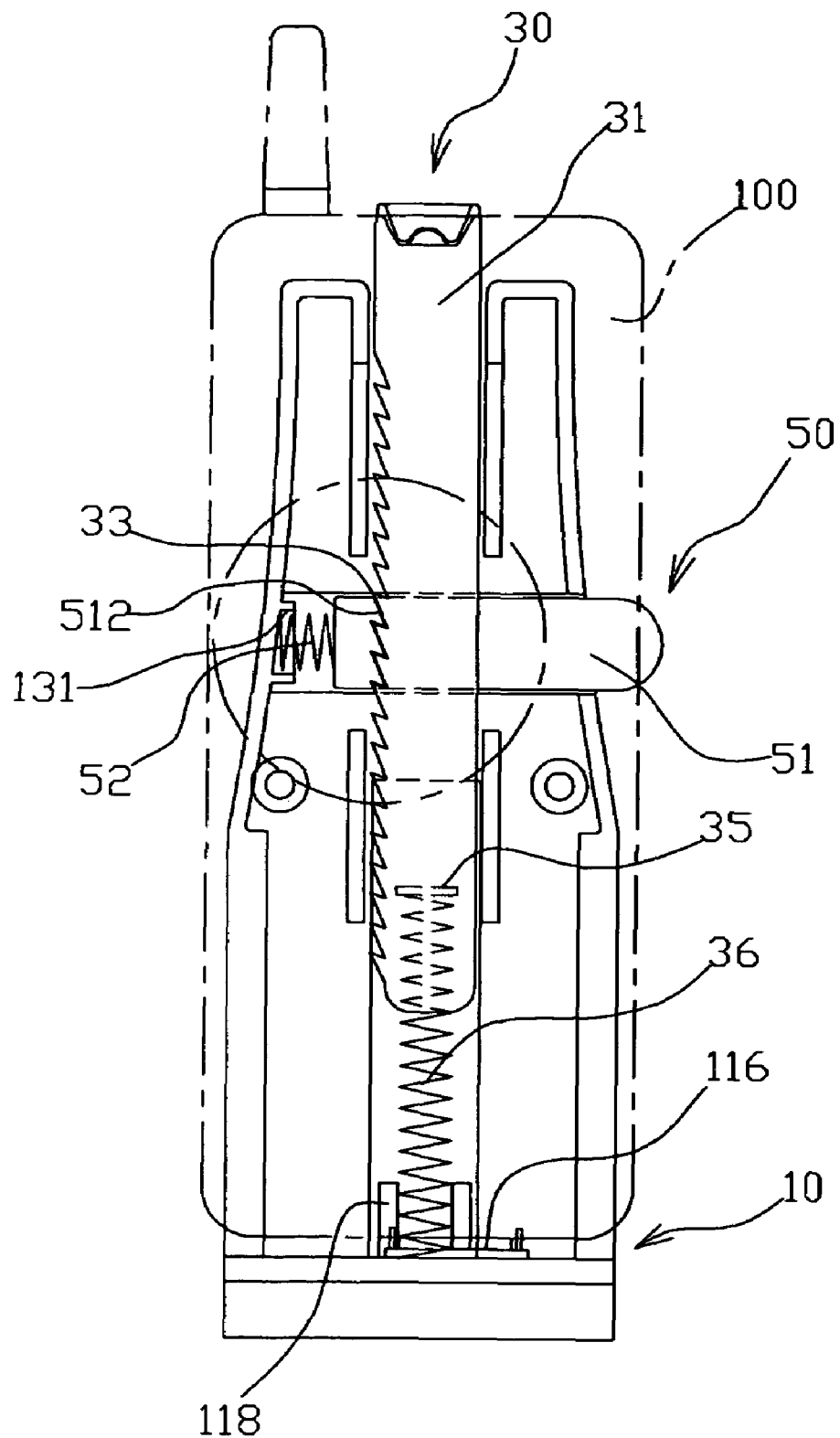
FIG. 4 is a front view of the assembled holder in accordance with a preferred embodiment of the present invention.

As shown in FIGS. 2 through 4, the cellular phone holder of the present invention comprises a holder apparatus 10, a fixed apparatus 30, and an operating apparatus 50. The holder apparatus 10 comprises a main body 11 and a base plate 12. The main body 11 comprises the longitudinal rib sets 111 and the transverse slot 112. A sliding guide 113 is formed at the middle of the longitudinal rib set 111. A trench 114 is formed on the top of the sliding guide 113. An operating notch 119 is formed on one end of the transverse slots 112. A spring socket 131 is disposed on another end of the transverse slots 112 corresponding to the operating notch 119. A charging base 115 and a spring base 118 are disposed on the bottom of the main body 11. The charging base 115 comprises an electrical connector 116 disposed thereon for charging. The electrical connector 116 is designed to separately embed within the charging base 115. When using the different cellular phones, the electrical connector 116 is exchangeable to assemble with the charging base 115, depending on the different standards, in order to provide a universal charging base. The receiving cylinders 171 are disposed on the main body. The corresponding tapped holes 121 are disposed on the side of the base plate 12 against the main body 11, thereby securely jointing the main body 11 by the bolts 132. The base plate 12 further comprises a trench 122 on the top and a surrounding plate 123 on the bottom. The surrounding plate 123 is disposed against the charging base 115, and a fixed trench 124 is formed between the surrounding plate 123 and the charging base 115.

The fixed apparatus 30 comprises a fixed plate 31. An arced snapping plate 32 is formed on the top end of the fixed plate 31. The teeth-formed end 34 composed of a plurality of protruding teeth 33 is formed on one side of the fixed plate 31. The protruding teeth 33 are designed to upwardly incline, that is, the upper teeth 331 and the lower teeth 332 of the protruding teeth 33 are represented by an upwardly inclined plane with a horizontal plane. A propping plate 35 is projected from the fixed plate 31 against the main body 11. A spring 36 is positioned in the spring base 118 of the main body 11 for propping the propping plate 35.

The operating apparatus 50 comprises an operating element 51, which is positioned in the transverse slot 112, and an arced pressing element 511 is formed on one end of the operating element 51. The pressing element 511 is projected form operating notch 119 of the main body 11. Three propping teeth 512 corresponding to the protruding teeth 33 are formed on another end of the operating element 51. The propping teeth 512 are designed to downwardly incline, that is, the upper teeth 513 and the lower teeth 514 of the protruding teeth 512 are represented by an downwardly inclined plane with a horizontal plane. In this preferred embodiment of the present invention, the number of the protruding teeth 512 is at least two. A spring 52 is positioned in the spring base 131 of the main body 11 for propping the operating element 51.

Figure 5:
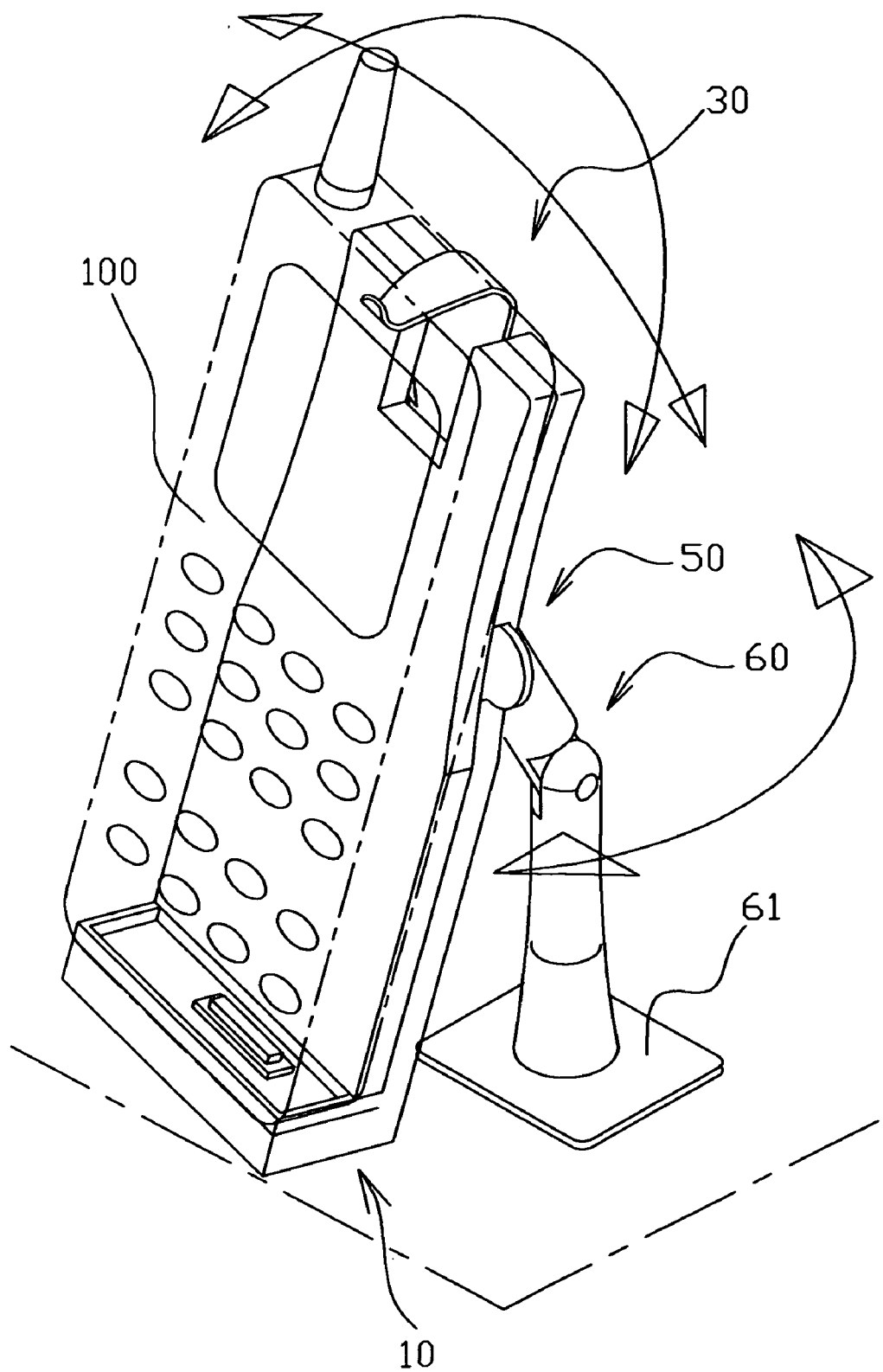
FIG. 5 is a perspective view showing the application of the cellular phone holder in accordance with a preferred embodiment of the present invention.

As shown in FIG. 5, a fixed element 60 is disposed (by screwing or mounting) on the backside of the improved structure of cellular phone holder according to the present invention. An attachable plate 61 (or a screwing plate) is disposed on one end of the fixed element 60 and attached to the proper position in the car, thereby fastening the cellular phone 100.

Figure 6:
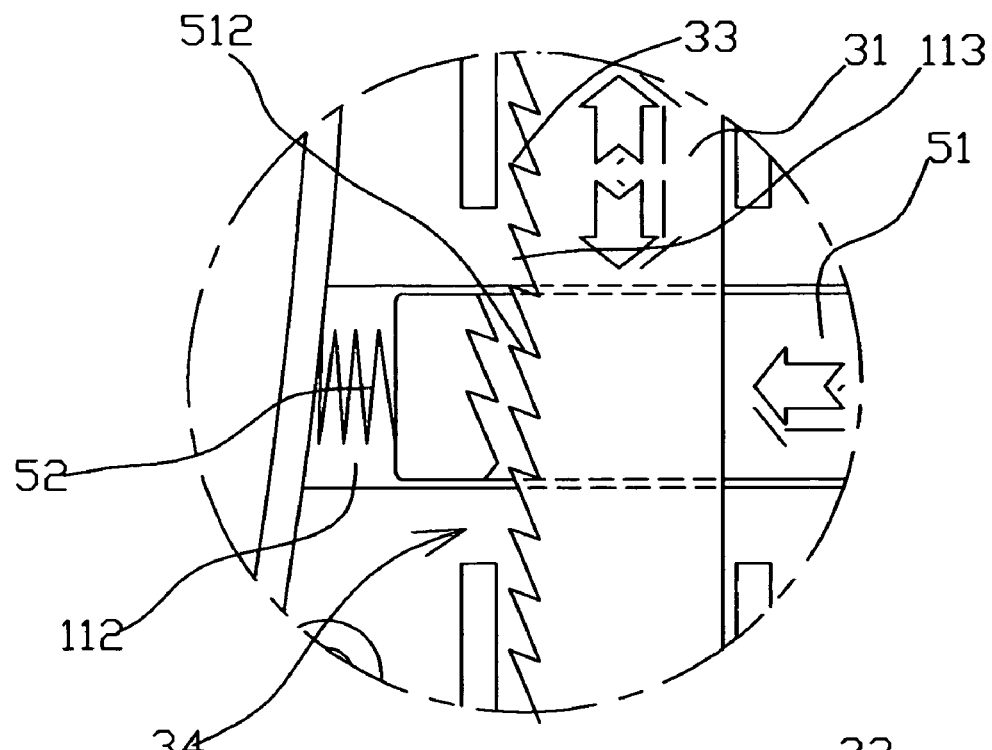
FIG. 6 is an enlarged view the operation of the cellular phone holder whiling loosing in accordance with a preferred embodiment of the present invention.
Figure 7:
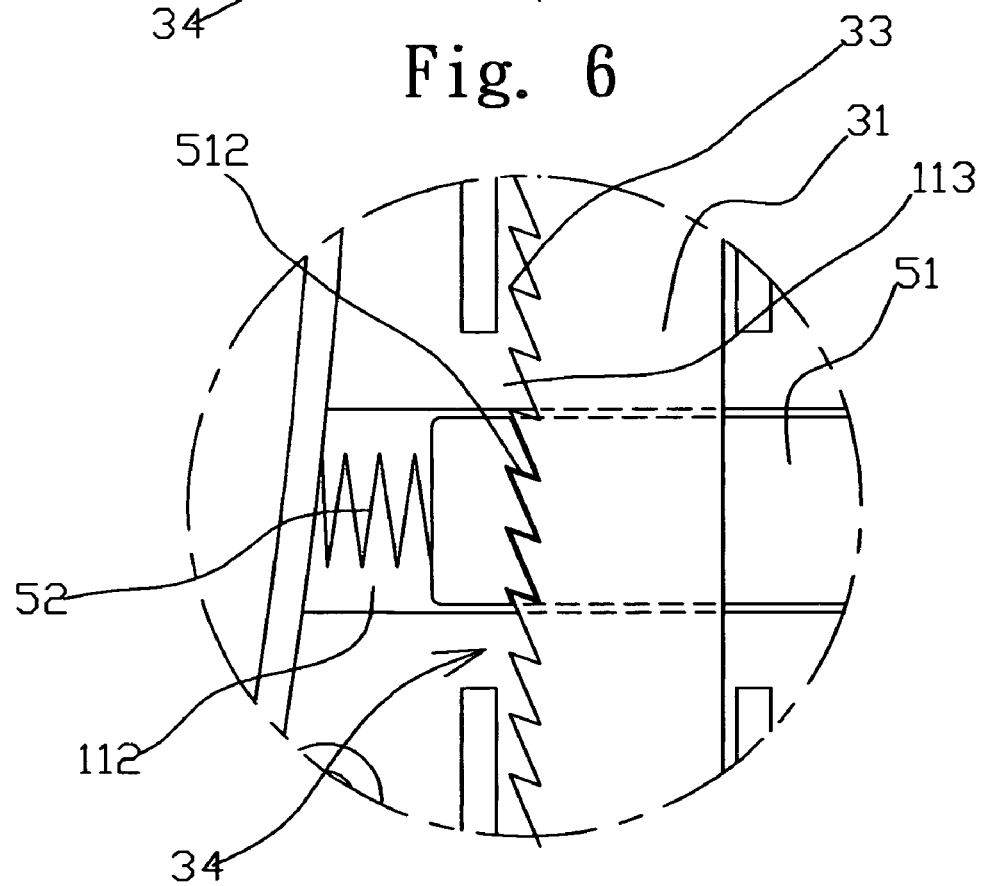
FIG. 7 is an enlarged view the operation of the cellular phone holder whiling assembled in accordance with a preferred embodiment of the present invention.

As shown in FIG. 6, firstly, the operating element 51 is pressed while operating the cellular phone holder of the present invention, thereby departing the propping teeth 512 of the operating element 51 from the protruding teeth 33, resulting in arising the fixed plate 31. After the cellular phone 100 is placed in the fixed trench 124 of the base plate 12 (as shown in FIG. 5), the fixed plate 31 is downwardly pressed, thereby snapping the top of the cellular phone 100 by the arced snapping plate 32 on the top of the fixed plate 31. Since the operating element 51 is subjected to the head of the spring 52 to prop the protruding teeth 33, the operation of placing the cellular phone is finished when the arced snapping plate 32 props the top of the cellular phone 100 (as shown in FIG. 7).

According to the present invention, the protruding teeth 33 of the fixed plate 31 and the propping teeth 512 of the operating element 51 have the same number and are engaged together simultaneously. The protruding teeth 33 and the propping teeth 512 are represented by a specified incline plane, thereby securely engaging without sliding. When the fixed plate 31 is pressed to prop the cellular phone 100, the operation of pressing the fixed plate 51 is going smoothly because the direction of pressing the fixed plate 51 and the inclined plane of engaging the protruding teeth 33 with the propping teeth 512 represent a clockwise direction, thereby effectively reducing the noise generated by engaging 33 the protruding teeth 33 with the propping teeth 512.

The embodiment above is only intended to illustrate the present invention; it does not, however, to limit the present invention to the specific embodiment. Accordingly, various modifications and changes may be made without departing from the spirit and scope of the present invention as described in the following claims.

What is claimed is:

1. A cellular phone holder, comprising:
 a holder apparatus comprising a main body;
 a fixed apparatus comprising a fixed plate longitudinally disposed thereon, and a teeth-formed end composed of a plurality of protruding teeth is formed on one side of said fixed plate, and said protruding teeth are upwardly inclined; and
 an operating apparatus comprising an operating element, and said operating element is transversely disposed on said main body, and a plurality of propping teeth corresponding to said teeth-formed end are formed on said operating element, and said propping teeth are downwardly inclined.

2. The cellular phone holder of claim 1, wherein said main body comprises a sliding guide disposed thereon for pivoting said operating element.

3. The cellular phone holder of claim 1, wherein said main body comprises a slot disposed thereon for pivoting said operating element.

4. The cellular phone holder of claim 2, wherein a trench is formed on the top of said sliding guide.

5. The cellular phone holder of claim 3, wherein an operating notch is formed on one side of the slot.

6. The cellular phone holder of claim 5, wherein a spring base are disposed on one end of slot corresponding to the operating notch, and wherein a spring is received in the spring base.

7. The cellular phone holder of claim 1, wherein a charging base and a spring base are disposed on the bottom of said main body, and said charging base comprises an electrical connector formed thereon for charging, and a spring is received in said spring base.

8. The cellular phone holder of claim 7, wherein a propping plate is projected from said fixed plate against said main body.

9. The cellular phone holder of claim 7, wherein said electrical connector is separately embedded within the charging base in order to provide a universal charging base function.

10. The cellular phone holder of claim 1, wherein said main body further comprises a base plate securely jointing with said main body.

11. The cellular phone holder of claim 10, wherein said base plate further comprises a trench on the top and a surrounding plate on the bottom, and a fixed trench is formed on said surrounding plate.

12. The cellular phone holder of claim 1, wherein an arced snapping plate is formed on the top end of the fixed plate.

13. The cellular phone holder of claim 1, wherein said protruding teeth comprises an upper teeth and a lower teeth represented by an upwardly inclined plane with a horizontal plane.

14. The cellular phone holder of claim 1, wherein an arced pressing element is formed on one end of said operating element, and said arced pressing element is projected form said operating notch.

* * * * *